(12) United States Patent
Vasudevan et al.

(10) Patent No.: US 12,519,720 B2
(45) Date of Patent: Jan. 6, 2026

(54) DYNAMIC SETUP OF END-TO-END CIRCUITS IN HYBRID PACKET AND TDM NETWORKS

(71) Applicant: Cisco Technology, Inc., San Jose, CA (US)

(72) Inventors: Bharath Vasudevan, Bangalore (IN); Christian Schmutzer, Koenigsbrunn im Weinviertel (AT)

(73) Assignee: CISCO TECHNOLOGY, INC., San Jose, CA (US)

( * ) Notice: Subject to any disclaimer, the term of this patent is extended or adjusted under 35 U.S.C. 154(b) by 440 days.

(21) Appl. No.: 18/296,399

(22) Filed: Apr. 6, 2023

(65) Prior Publication Data

US 2024/0340236 A1 Oct. 10, 2024

(51) Int. Cl.
*H04L 45/50* (2022.01)
*H04L 9/40* (2022.01)
*H04L 12/66* (2006.01)
*H04L 45/00* (2022.01)

(52) U.S. Cl.
CPC .............. *H04L 45/50* (2013.01); *H04L 12/66* (2013.01); *H04L 45/66* (2013.01); *H04L 63/0272* (2013.01)

(58) Field of Classification Search
CPC . H04L 65/1016; H04L 12/2801; H04L 67/10; H04L 45/50; H04L 45/28; H04L 41/0668; H04L 43/0811; H04L 41/5067; H04L 41/5009; H04L 41/12; H04L 45/22
See application file for complete search history.

(56) References Cited

U.S. PATENT DOCUMENTS

| 7,466,916 B2 * | 12/2008 | Mitra | H04L 47/70 398/58 |
| 8,942,256 B1 * | 1/2015 | Barth | H04L 45/03 370/255 |
| 2006/0209716 A1 * | 9/2006 | Previdi | H04L 45/50 370/254 |
| 2015/0063802 A1 * | 3/2015 | Bahadur | H04L 47/781 398/49 |
| 2018/0041392 A1 | 2/2018 | Blair | |
| 2019/0356581 A1 | 11/2019 | Brissette et al. | |
| 2022/0158950 A1 | 5/2022 | Hu et al. | |
| 2022/0224410 A1 | 7/2022 | Annavajjala et al. | |

(Continued)

OTHER PUBLICATIONS

Juniper Networks, "MPLS Packetized Transport for Next-Generation Networks," MPLS-based Packet Transport Ideal for Public and Private Network Resource Consolidation, www.juniper.net, Sep. 2015, 11 pages.

(Continued)

*Primary Examiner* — Kharye Pope
(74) *Attorney, Agent, or Firm* — Edell, Shapiro & Finnan, LLC (57) ABSTRACT

Presented herein are techniques that remove the unnecessary provisioning system complexities of manual inter-domain service/circuit stitching by introducing a solution to perform dynamic end-to-end circuit setup in a hybrid networking environment. A method is provided that is performed by a gateway node at a boundary of a first domain and a second domain of a hybrid network, the first domain and the second domain using different types of transport and different types of control planes.

21 Claims, 8 Drawing Sheets

(56) References Cited

U.S. PATENT DOCUMENTS

2022/0321451 A1 10/2022 Brissette et al.
2023/0021278 A1 1/2023 Filsfils et al.

OTHER PUBLICATIONS

Zhang, X., et al., "RSVP-TE Signaling Procedure for End-to-End GMPLS Restoration and Resource Sharing," Internet Engineering Task Force (IETF), RFC 8131, GMPLS Restoration and Resource Sharing, Mar. 2017, 15 pages.

Berger, L., "Generalized Multi-Protocol Label Switching (GMPLS) Signaling Resource ReserVation Protocol-Traffic Engineering (RSVP-TE) Extensions," Network Working Group, Movaz Networks, RFC 3473, GMPLS Signaling—RSVP-TE Extensions, Jan. 2003, 42 pages.

Rao, D., et al., "BGP Color-Aware Routing (CAR) draft-dsko-bess-bgp-car-05," Internet-Draft, BESS WorkGroup, Jul. 5, 2022, 56 pages.

Martini, L., et al., "Dynamic Placement of Multi-Segment Pseudowires," Internet Engineering Task Force (IETF), RFC 7267, Dynamic Placement of Multi-Segment PWs, Standards Track, Jun. 2014, 24 pages.

Farrel, A., et al., "Crankback Signaling Extensions for MPLS and GMPLS RSVP-TE," Network Working Group, Category: Standards Track, RFC 4920, Crankback Signaling Extensions, Jul. 2007, 38 pages.

Vasseur, JP., et al., "A Per-Domain Path Computation Method for Establishing Inter-Domain Traffic Engineering (TE) Label Switched Paths (LSPs)," Path Comp. for Inter-Domain TE LSPs, Network Working Group, Standards Track, RFC 5152, Feb. 2008, 21 pages.

Farrel, A., et al., "Inter-Domain MPLS and GMPLS Traffic Engineering—Resource Reservation Protocol-Traffic Engineering (RSVP-TE) Extensions," Inter-Domain MPLS & GMPLS RSVP-TE Extensions, Network Working Group, Standards Track, RFC 5151, Feb. 2008, 25 pages.

Ayyangar, A., et al., "Label Switched Path Stitching with Generalized Multiprotocol Label Switching Traffic Engineering (GMPLS TE)," LSP Stitching with GMPLS TE, Network Working Group, Standards Track, RFC 5150, Feb. 2008, 19 pages.

Berger, L. "GMPLS Signaling Procedure for Egress Control," GMPLS Signaling Procedure for Egress Control, Network Working Group, Standards Track, RFC 4003, Feb. 2005, 5 pages.

Papadimitriou, D., "Generalized Multi-Protocol Label Switching (GMPLS) Signaling Extensions for G.709 Optical Transport Networks Control," GMPLS Signaling Extensions for G.709, Network Working Group, Standards Track, RFC 4328, Jan. 2006, 23 pages.

Berger, L., "Generalized Multi-Protocol Label Switching (GMPLS) Signaling Functional Description," GMPLS Signaling Functional Description, Network Working Group, Standards Track, RFC 3471, Jan. 2003, 34 pages.

Mannie, E., "Generalized Multi-Protocol Label Switching (GMPLS) Architecture," GMPLS Architecture, Network Working Group, Standards Track, RFC 3945, Oct. 2004, 69 pages.

* cited by examiner

DYNAMIC SETUP OF END-TO-END CIRCUITS IN HYBRID PACKET AND TDM NETWORKS

TECHNICAL FIELD

The present disclosure relates to hybrid networking environments.

BACKGROUND

As new networking technologies are introduced over time, hybrid network scenarios are becoming very common. These hybrid networks are usually built with at least two domains, each using a different networking technology. In such a scenario, a circuit spanning technology domains has to be manually established end-to-end, or two circuit segments established via distinct control planes in each technology domain have to be manually stitched together at distinct domain boundary (gateway) nodes.

DESCRIPTION OF EXAMPLE EMBODIMENTS

Overview

Presented herein are techniques to dynamically create circuits in a hybrid networking environment. In one embodiment, a method is provided that is performed by a gateway node at a boundary of a first domain and a second domain of a hybrid network, the first domain and the second domain using different types of transport and different types of control planes. The method involves advertising in the first domain reachability information to nodes in the second domain. The method includes receiving from a first node in the first domain, a request to set up a circuit from a first endpoint on the first node to a second endpoint on a second node in the second domain, the request (a) causing a selection leveraging the control plane in the first domain of the gateway node among a plurality of gateway nodes at the boundary of the first domain and the second domain, or (b) indicating the selection of the gateway node by the first node, based on the reachability information to establish the circuit. The method further includes sending to the second node a message to establish a connection in the second domain from the gateway node to the second node; receiving from the second node a message confirming establishment of the connection between the second node and the gateway node; and sending to the first node a message indicating that the gateway node has successfully set up the circuit between the first node and the second node.

EXAMPLE EMBODIMENTS

Establishing end-to-end circuits across domains of a hybrid network can be complex. There can be an increased provisioning system complexity due to the need for manual end-to-end provisioning or manual stitching at the domain boundary. This also involves detailed awareness on the part of the provisioning system that there is a hybrid network and how the different networking technologies can be interworked. Further, due to the manual nature of the solution, there is no way for the network to establish an on-demand restoration circuit without intervention of the provisioning system or an external controller for catastrophic failure cases where both the working circuit and protect circuit go down. Network operators strive for more simplicity in their provisioning, and restoration is becoming increasingly attractive for network operators as the "on-demand" nature does not mandate pre-provisioning and pre-allocation of additional costly resources upfront.

Figure 1A:
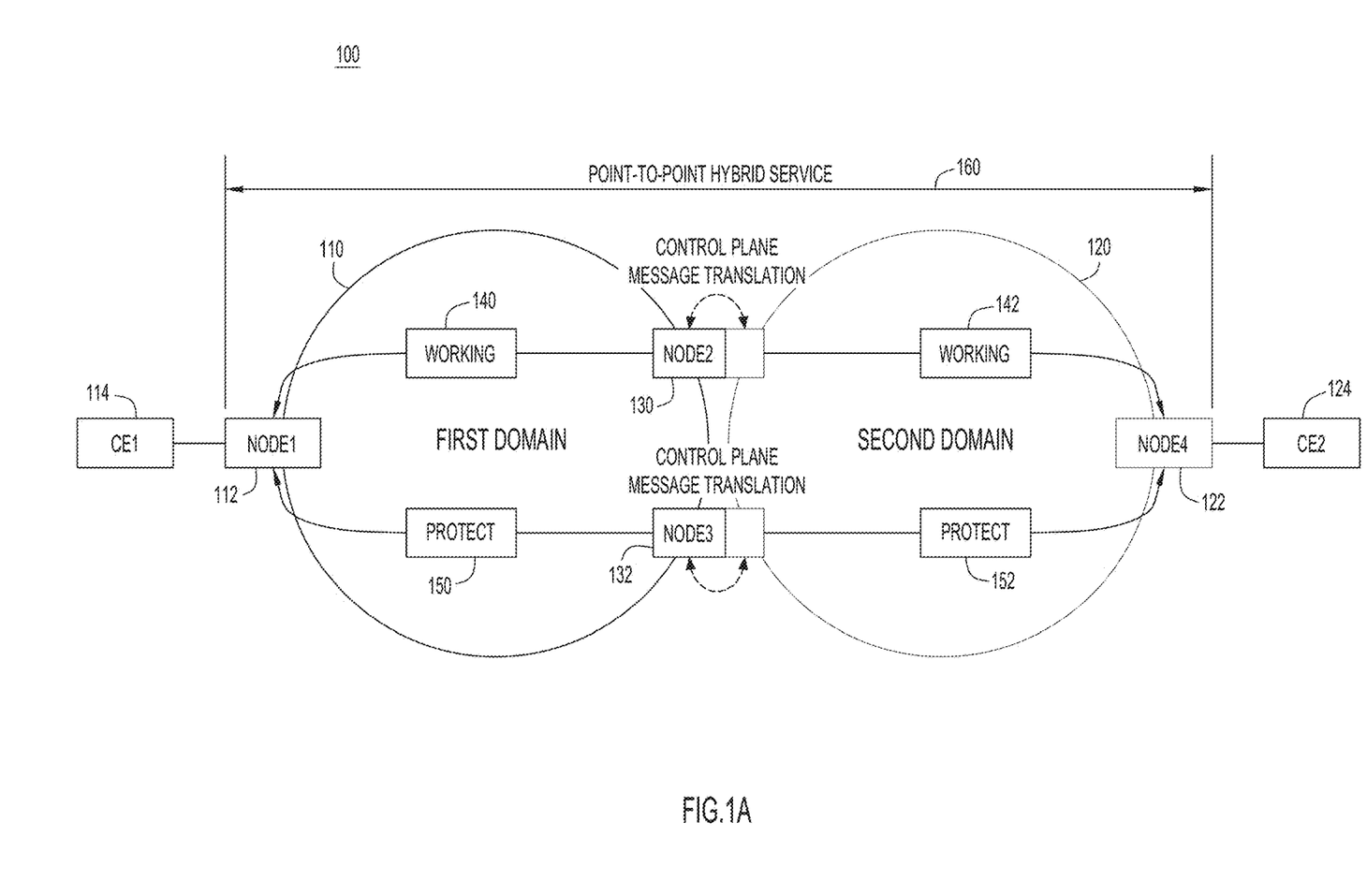
FIG. 1A illustrates an example hybrid networking environment in which the techniques presented herein may be employed, according to an example embodiment.

FIG. 1A shows an example hybrid network 100 that includes a first domain 110 of a first technology type and a second domain 120 of a second technology type. The first and second domains 110 and 120 use different types of transport protocols as well as different types of control planes. As one example, the first domain 110 is a packet networking domain and the second domain 120 is an optical networking domain. Examples of technologies that may be used in a packet domain include Private Line Emulation (PLE), Multi-Protocol Label Switching (MPLS), Ethernet Virtual Private Network (EVPN)-Virtual Private Wire Service (VPWS) and examples of technologies that may be used in an optical domain include Optical Transport Network (OTN), Synchronous Optical Network (SONET) and Synchronous Digital Hierarchy (SDH).

In the first domain 110 there is a first node (Node1) 112 that has connectivity to a first endpoint denoted customer edge (CE1) 114. There are gateway boundary nodes 130 and 132 (Node2 and Node3) translating between the control plane messages of the first domain 110 and control plane messages of the second domain 120. A second node 122 in the second domain 120 has connectivity to a second endpoint denoted CE2 124. CE1 114 or CE2 124 may serve as a terminator or initiator of a point-to-point connection across the hybrid network 100.

Gateway boundary nodes 130 and 132 translate between control plane messages of Node1 and control plane messages of Node4, allowing for the end-to-end setup of a working circuit between Node1 and Node4 that consists of a working circuit path 140 in the first domain 110 and a working circuit path 142 in the second domain 120, as well as a protect circuit between Node1 and Node4 that consists of a protect circuit path 150 in the first domain 110 and a protect circuit path 152 in the second domain 120. Thus, the gateway boundary nodes 130 and 132 are configured to establish a point-to-point hybrid service 160 across the first domain 110 and the second domain 120. As an example, the gateway boundary nodes 130 and 132 perform a control plane message translation between Generalized MPLS (GMPLS) and EVPN.

Figure 1B:
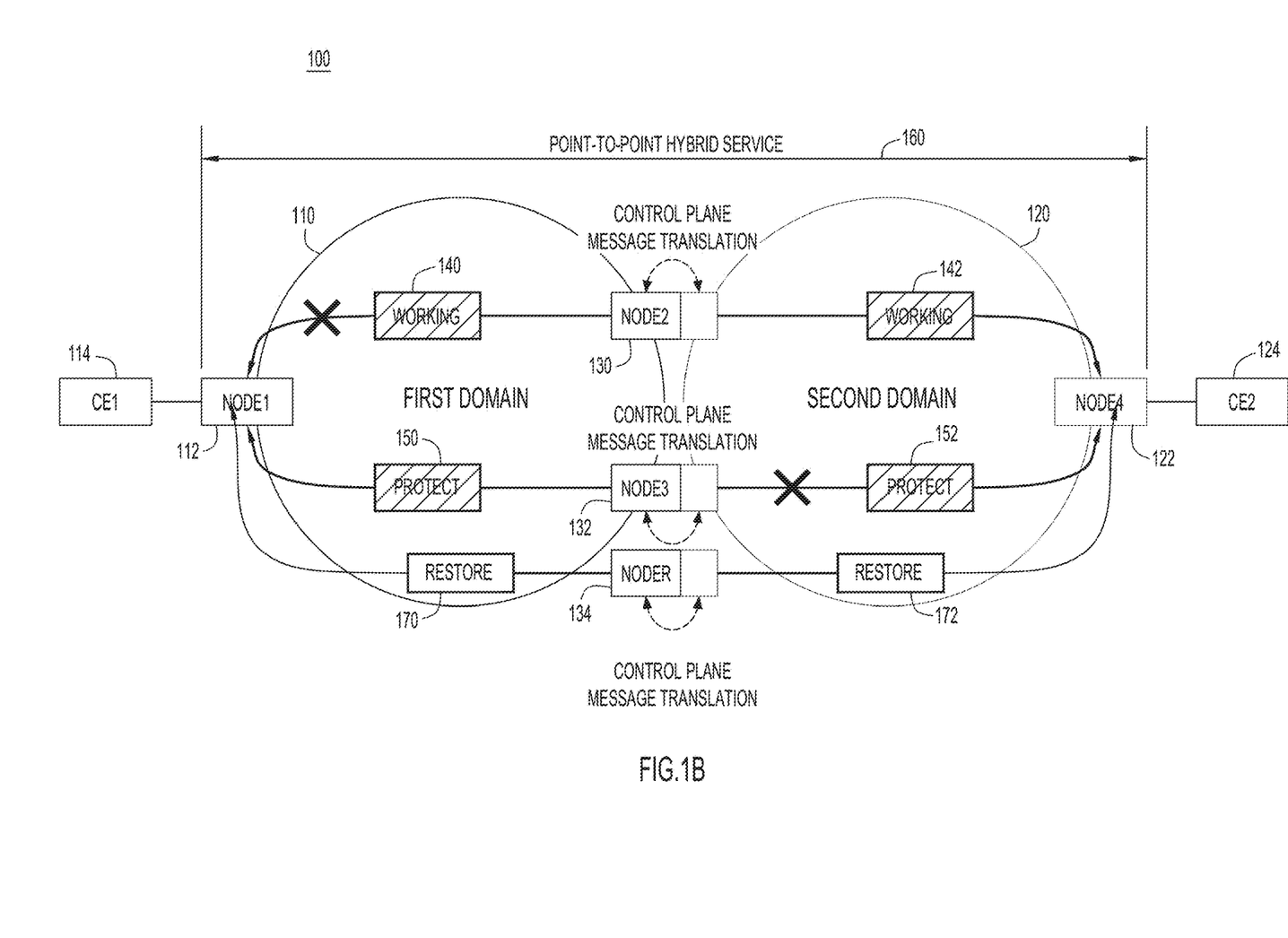
FIG. 1B illustrates an example of a double-failure that brings down both the working circuit and protect circuit in a hybrid networking environment by establishing an on-demand restore circuit using the techniques presented, according to an example embodiment.

The paths could be created for initial circuit creation, to restore a circuit, or to create a working and/or protect circuit. According to the techniques presented herein, circuits are set up in a dynamic fashion, as opposed to being statically configured by a control entity for the hybrid network. A failure that brings down both the working circuit and/or protect circuit can be overcome by establishing an on-demand restore circuit as shown in FIG. 1B. In this example, the working circuit fails due to the failure of the working circuit path 140 in the first domain 110 and protect circuit fails due to the failure of the protect circuit path 152 in the second domain 120. The restore circuit consist of a restore circuit path 170 in the first domain 110 and a restore circuit path 172 in the second domain 120, via another gateway node 134, NodeR. The restore circuit can be established through the gateway boundary nodes 130 or 132 that were used for the working circuit and protect circuit, or can also be routed via any other node acting as gateway node in this hybrid network 100, as shown by NodeR.

The setup of the working circuit, protect circuit and restore circuit can be dynamically established with no assumptions on an Operations Support System (OSS) doing it on a per domain basis. The techniques presented herein can address various failure scenarios that would bring down the hybrid service, and in so doing, find a restore circuit in both domains and potentially even a third node to serve as gateway node. The techniques may involve selecting a gateway node from a set of candidate gateway nodes, and then selecting which path to use. If it is not possible to find a path to gateway boundary nodes 130 and 132, or if those nodes have themselves failed, then some other gateway node and path is selected to handle the traffic. Achieving this in a mixed/hybrid network (packet and optical, for example) presents challenges to be overcome because there are two control planes that have to interact. Topologies are no longer fixed and there is a dynamic behavior and interaction for actual setup of the circuit paths to be performed. When restoring a hybrid service, things may have changed in the network topology so that the circuits are to be created dynamically, such as by selecting another gateway node (or a path to another gateway node) that is not known ahead of time. Which path and which gateway node to select may depend on when the failure happens and what the hybrid network looks like at that time. This is where the dynamic interaction comes into play because if one side of the network (one network domain) is making a dynamic decision based on the current situation, the other side (the other network domain) of the network has to follow suit.

Procedures for inter-domain networking scenarios are covered in Request for Comment (RFC) 5150, RFC 5151, RFC 5152 and RFC 4920. In all these existing specifications the assumption is that the domains are built from identical technologies (all packet networking or all optical networking, for example).

One unique aspect of the interworking mechanisms presented herein is that they allow for the domains to be based on different technologies, which was not possible to date. Again, this may be used for restoration but it also may be used for basic setup of a working circuit and/or a protect circuit. The following description does not refer to restoration or working/protect circuit setup, but rather how to set up a hybrid circuit from point A to point Z, considering that setup can be initiated from the left side (starting from the first network domain, e.g., a packet domain), or starting it from the right side (starting from the second network domain, e.g., an optical network domain), regardless of whether it is used for restoration or other purposes.

Figure 2:
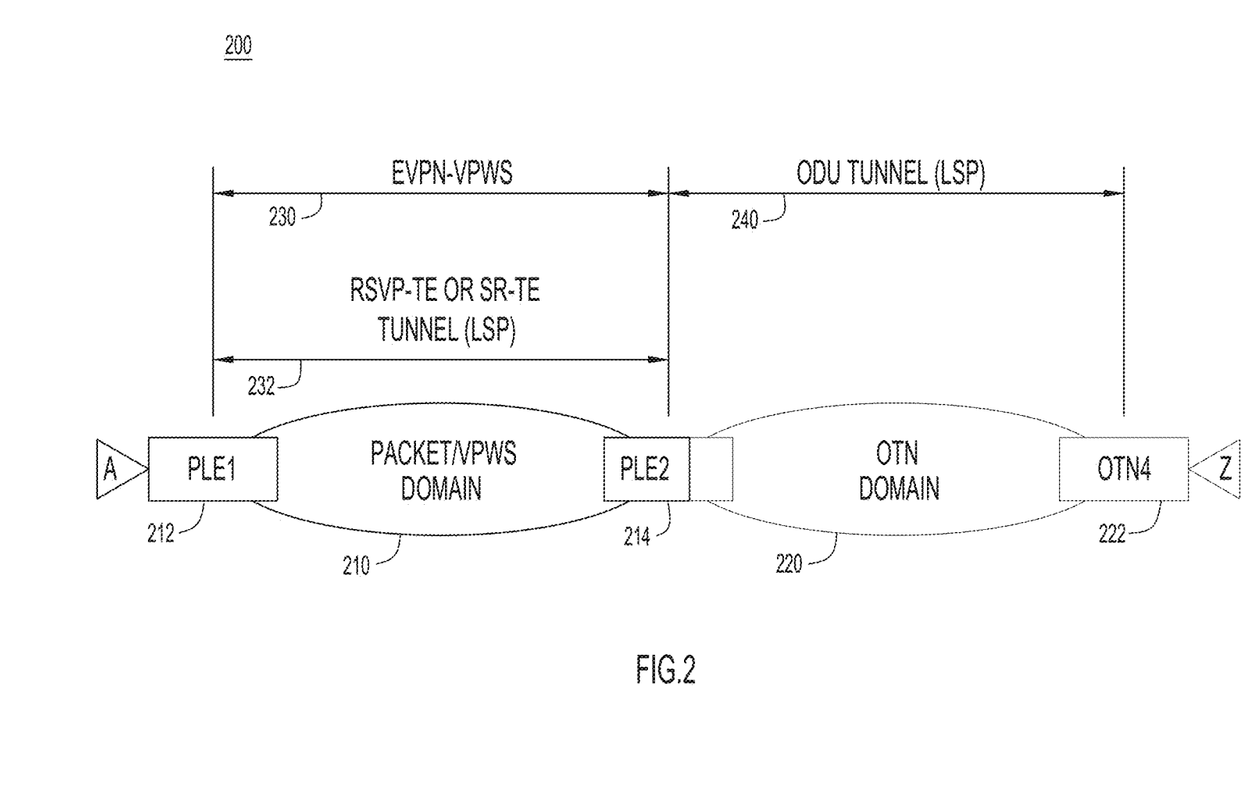
FIG. 2 shows an example of a hybrid network environment comprising a packet networking domain and an optical networking domain in which the techniques presented herein may be employed, according to an example embodiment.

Reference is now made to FIG. 2. FIG. 2 shows an example of a hybrid network 200 comprising a packet/VPWS domain 210 and an OTN domain 220. In this example hybrid network, there is a PLE node 212 (PLE1) in packet/VPWS domain 210 that has connectivity to endpoint A, a gateway node 214 (PLE2) at a boundary of the packet/VPWS domain 210 and OTN domain 220, and a OTN node 222 (OTN4) in the OTN domain 220 that has connectivity to endpoint Z.

In a packet network domain, a "circuit" includes two elements
1. A pseudowire 230: connecting the two ports (referred to as the "overlay"), e.g., EVPN-VPWS.
2. A traffic engineered tunnel (Labeled-Switch Path or LSP) 232: providing a path with a certain bandwidth commitment through the network (referred to as the "underlay transport"), e.g., Resource Reservation Protocol-Traffic Engineering (RSVP-TE) or Segment Routing Traffic Engineering (SR-TE) tunnel.

An LSP can be set up using any of various signaling protocols such as Label Distribution Protocol (LDP), RSVP, or Border Gateway Protocol (BGP). The path begins at an ingress provider edge (PE) switch, which makes a decision on which label to prefix to a packet based on the appropriate forwarding equivalence class (FEC).

In the OTN domain 220, there is one mechanism, e.g., an optical data unit (ODU) tunnel 240 (via LSP). The control plane in the OTN domain may use RSVP-TE, e.g., for General MPLS (GMPLS). This means that interworking procedures between RSVP-TE (GMPLS) in the OTN domain 220 and BGP (EVPN-VPWS) and RSVP-TE or SR-TE in the packet/VPWS domain 210 take into account that the OTN control plane operation is single-ended.

To summarize, in the example hybrid network 200, there is an EVPN-VPWS (PW) 230 overlay running over an underlay transport (RSVP-TE or SR-TE) 232 in the packet/VPWS domain 210 and an ODU tunnel 240. The ODU tunnel (OTN circuit) is established by the OTN control plane, e.g., GMPLS. In the packet network, the EVPN-VPWS (PW) 230 may use BGP as the control plane, and the underlay transport could be a RSPV-TE tunnel or SR-TE tunnel.

Currently, when setting up a circuit in a hybrid network environment, it is done statically/programmatically through configurations. Separate provisioning operations need to be done in each network domain in order to form the hybrid circuit. With the techniques presented herein, a circuit is requested, e.g., from A to Z, and the control plane protocol interaction performs appropriate operations in the packet/VPWS/domain 210 and in the OTN domain 220, and also determines which node is to serve as the gateway node. Without these techniques, the segments in each domain would have to be built separately and then those segments would be stitched together.

For redundancy purposes, two or more boundary/gateway nodes are present between the domains, and the procedures presented herein are capable of selecting the best/appropriate gateway node.

Figure 3:
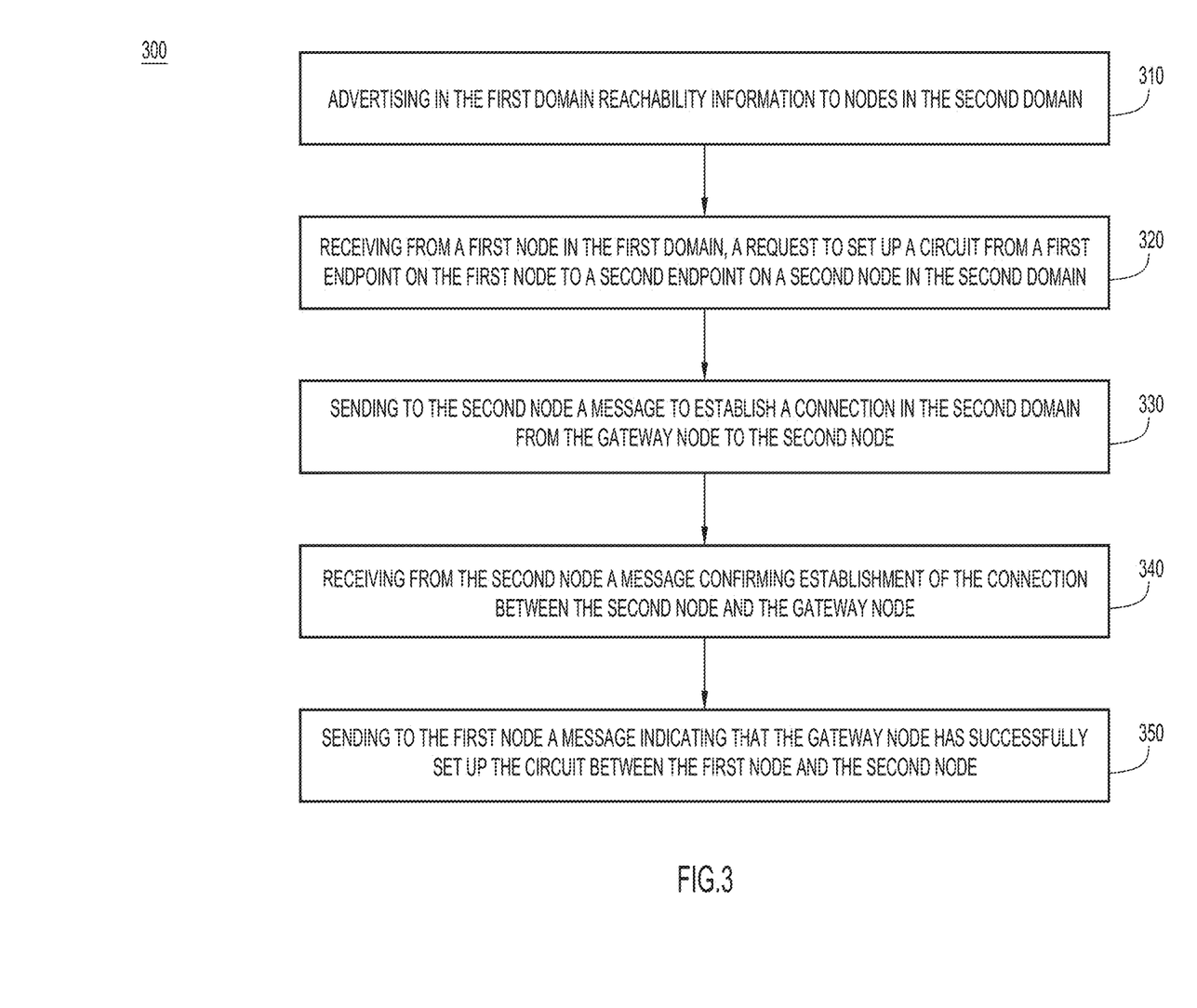
FIG. 3 illustrates a flow chart depicting a method performed by a gateway node at a boundary of a first domain and a second domain of a hybrid network, according to an example embodiment.

Turning now to FIG. 3, a flow chart is shown depicting, at a high-level, a method 300 performed by a gateway node at a boundary of a first domain and a second domain of a hybrid network, the first domain and the second domain using different types of transport and different types of control planes. The method 300 comprises, at step 310, advertising in the first domain reachability information to nodes in the second domain. At step 320, the method 300 comprises receiving from a first node in the first domain, a request to set up a circuit from a first endpoint on the first node to a second endpoint on a second node in the second domain, the request (a) causing a selection leveraging the control plane in the first domain of the gateway node among a plurality of gateway nodes at the boundary of the first domain and the second domain, or (b) indicating the selection of the gateway node by the first node, based on the reachability information to establish the circuit. Thus, in one variation, the selection of the gateway node may be based on control plane information (the selection may be made by the first node itself or by a central path computation element which informs the first node as to which of the plurality of gateway nodes to select) or the control plane makes the selection of the gateway node. In another variation, the selection of the gateway node may be based on a management or network control entity (or path computation element) informing the first node as to which of the plurality of gateway nodes at the boundary to select.

At step 330, the method 300 involves sending to the second node a message to establish a connection in the second domain from the gateway node to the second node. At step 340, the method 300 comprises receiving from the second node a message confirming establishment of the connection between the second node and the gateway node. At step 350, the method 300 comprises sending to the first node a message indicating that the gateway node has successfully set up the circuit between the first node and the second node.

Figure 4A:
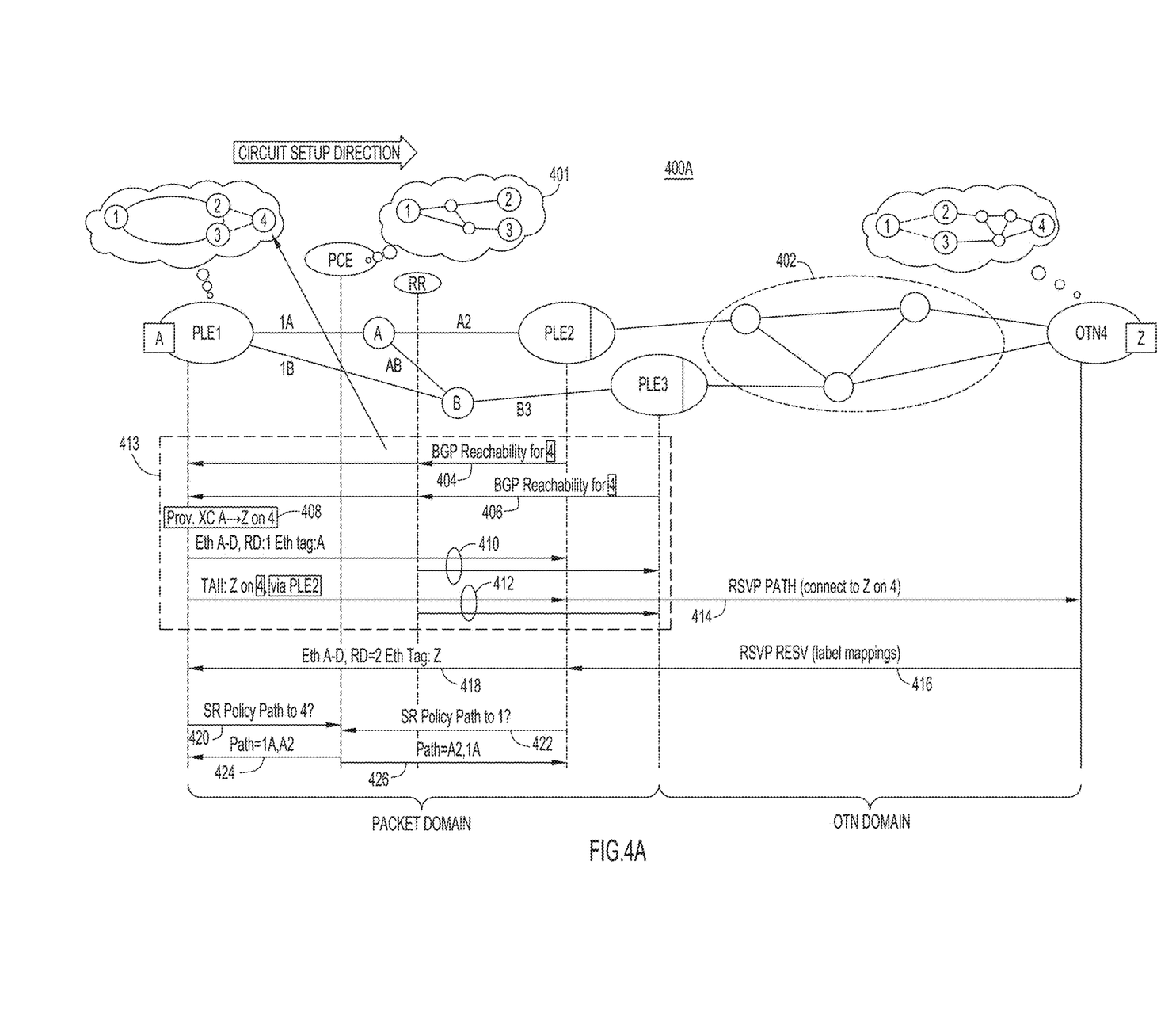
FIG. 4A is a diagram depicting a first process in which circuit setup initiation is in the packet networking domain and boundary node selection is performed in the overlay, according to an example embodiment.
Figure 4B:
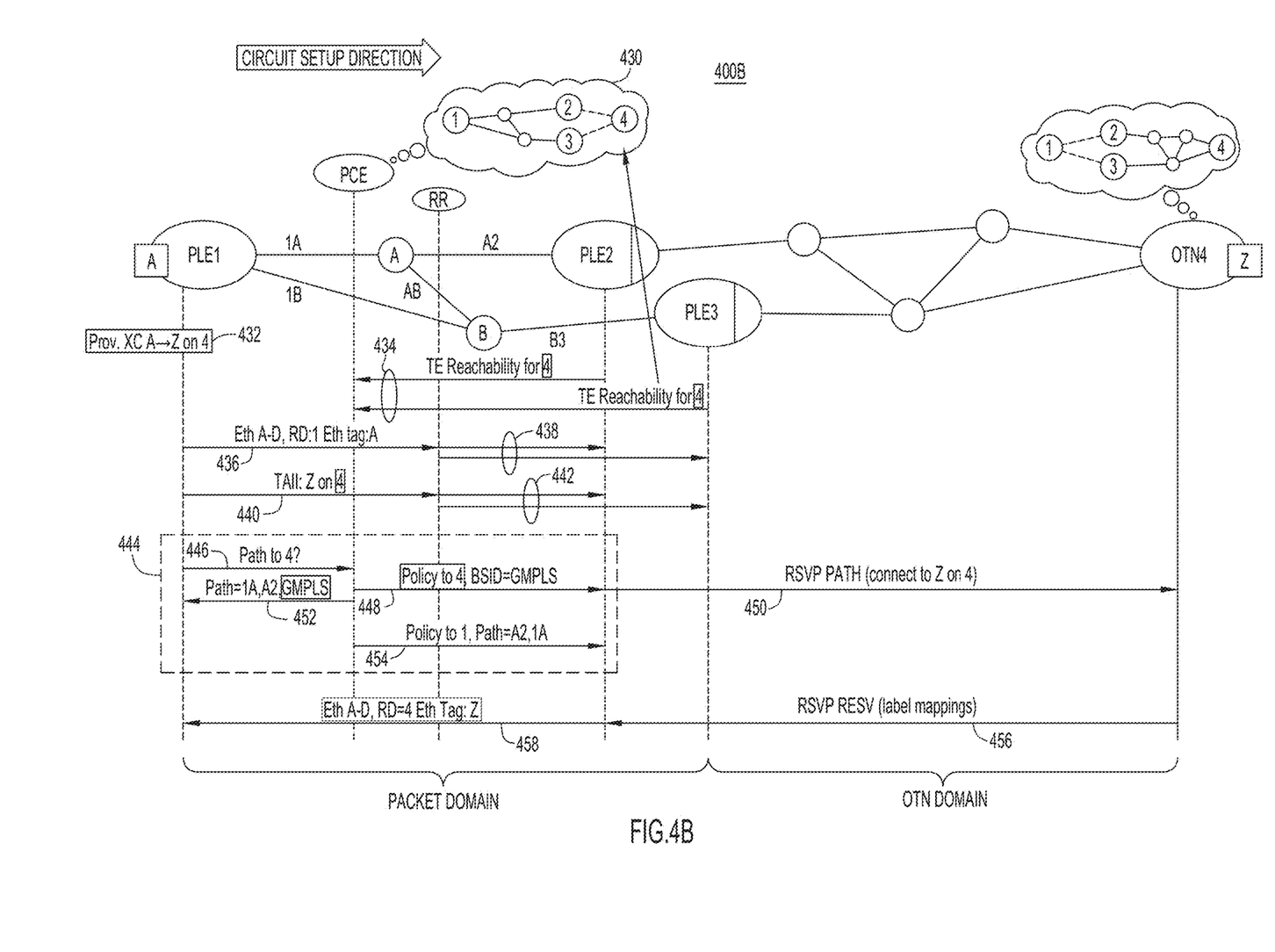
FIG. 4B is a diagram depicting a second process in which circuit setup initiation is in the packet networking domain and boundary node selection is performed in the underlay, according to an example embodiment.

The following description, in connection with FIGS. 4A and 4B, presents solutions for scenarios in which the initiator entity is in the packet networking domain and a scenario when the initiator entity is in the optical networking domain.

Packet Domain is Initiator

Given that in the packet domain there are two layers available (PW overlay and the LSP underlay transport), the solution can be solved in either layer (via overlay or via the underlay transport).

Boundary Node Selection in Overlay

FIG. 4A shows a process 400A by which boundary node selection is achieved in the overlay, such as via BGP. The relevant entities/devices in the process 400A are endpoint A connected on PLE1 in the packet domain, gateway/boundary nodes PLE2 and PLE3 at the boundary of the packet domain and the OTN domain, node OTN4 in the OTN domain, to which endpoint Z is connected. There is also a path computation element (PCE) in the packet domain and a Route Reflector (RR) node in the packet domain. The PCE keeps track of path related information, shown at reference numeral 401.

At 402, the boundary gateway routers PLE2 and PLE2 are configured to participate in GMPLS topology discovery in the OTN domain and learn that OTN4 is reachable in the OTN domain through GMPLS. At 404 and 406, respectively, PLE2 and PLE3 advertise this reachability information into the packet domain via BGP (such as by using the Multiprotocol Reachability Network Layer Reachability (MP_REACH_NLRI) attribute of BGP), which may be propagated by the RR. This allows initiators in the packet domain, such as PLE1, to perform the best boundary node selection towards the Target AII (TAII) Z on OTN4.

At 408, PLE1 provisions an EVPN cross connect (XC) to TAII (Target AII) Z on OTN4 ("Prov. XC A→Z on 4"). At 410, PLE1 next advertises its Ethernet Auto Discovery/EVPN Instance (EAD/EVI) route as indicated by "Eth A-D, RD:1 Eth tag:A". This advertises into the network (e.g., to PLE2 and PLE3) that PLE1 owns port A. In the case of a restore circuit, this is done on-demand in case of failures impacting the working path and protect path.

PLE1, on learning reachability for OTN4, selects the best path to reach OTN4 (best suitable gateway node, such as, for example, PLE2). At 412, PLE1 announces via BGP the peer attachment circuit Z on peer node OTN4, along with an indication of the selected domain egress border node PLE2, i.e., "TAII: Z on 4, via PLE2".

A new BGP EVPN signaling extension allowing a PE to communicate the peer node and peer attachment circuit (TAII) may be used at step 412. A similar concept is defined in RFC 4003 for OTN GMPLS, where the peer User Network Interface (UNI) port is communicated via a generalized label in the Explicit Route Object (ERO). A new BGP EVPN signaling extension may be employed that allows a PE to communicate the target egress domain boundary node. Both PLE2 and PLE3 will receive the update indicating OTN4/TAII Z but only PLE2 will act upon it because PLE2 was indicated as being the selected boundary gateway node.

The signaling performed from steps 404 through 412 may be viewed as Autonomous System Boundary Router (ASBR) selection in a service layer, shown at reference numeral 413. The router exchanges routing information with routers belonging to other AS's. Such a router advertises AS external routing information throughout the AS. The paths to each AS boundary router are known by every router in the AS.

At 414, PLE2 initiates a GMPLS circuit setup to OTN4 by sending a GMPLS RSVP PATH message "(connect to Z on 4)". This may be done by encoding TAII Z in an ERO per RFC 4003, for example. At 416, OTN4 sends an RSVP RESV message, with label mappings, in response to the RSVP PATH message sent at 414, to complete GMPLS setup. Once the GMPLS setup is complete, at 418, PLE2 advertises the EAD/EVI route for Z on OTN4 with RD representing itself, i.e., "Eth A-D, RD=2, Eth Tag: Z" indicating to PLE1 that PLE2 owns the connection to endpoint Z. This confirms to PLE1 that PLE2 has successfully set up the end-to-end connection from endpoint A to endpoint Z, and it is via PLE2.

To complete the end-to-end setup, PLE1 and PLE2 will instantiate a transport LSP (RSVP-TE or SR-TE) that is carrying the EVPN-VPWS. That is, at 420 PLE1 sends to the PCE an SR Policy Path to 4 request, and at 422 PLE2 sends to the PCE an SR Policy Path to 1 request. At 424, the PCE responds to PLE1 with the path information {1A,A2} indicating that PLE1 uses path 1A from PLE1 to node A, and then path A2 from node A to PLE2. Similarly, at 426, the PCE responds to PLE2 with the path information {A2,1A}.

Boundary Node Selection in Underlay

Reference is now made to FIG. 4B for a description of a process 400B in which the best boundary node selection is done in the underlay (e.g., SR-TE/RSVP-TE). In the process 400B, PLE1 (as the initiator) does not choose the best path (boundary gateway node) for OTN4, but instead announces the BGP update for TAII Z on OTN4.

To compute the best path in the underlay transport, the packet topology database used for transport LSP path computation includes information on which domain boundary nodes can reach which OTN nodes that can act as terminators. For inter-domain environments, there is a PCE is in place, and most likely a dedicated PCE in the packet domain and a dedicated PCE in the OTN domain. A single PCE supporting both domains and technologies is also a possibility. For the PCE in the packet domain, the ASBRs present an abstract domain with direct Forwarding Adjacencies (FAs) between ASBRs and OTN nodes (and similarly for the PCE in the OTN domain). Alternatively, if scalability is desired, each PE can be configured with a list of valid ASBRs from which to choose. In FIG. 4B, the PCE maintains path information shown at reference numeral 430.

In process 400B, reachability information about the OTN domain is leaked into the packet domain. At 432, PLE1 provisions the EVPN XC to TAII (Target AII) Z on OTN4 ("Prov. XC A→Z on 4"). At 434, PLE2 and PLE3 announce their TE reachability information (indicating to what they are topologically connected) in the OTN to OTN4, so that the PCE knows that PLE2 and PLE3 are connected in the OTN domain to OTN4 (in a manner that is abstracted for the PCE).

At 436, PLE1 uses EVPN to announce its Ethernet Auto Discovery Route/EVPN Instance (EAD/EVI) route as indicated by "Eth A-D, RD:1 Eth tag:A". This advertises into the network (to PLE2 and PLE3) that PLE1 owns port A. PLE1 sends this to the RR, which shares it with PLE2 and PLE3, as shown at 438.

Similarly, at 440, PLE1 announces to the RR a request for a peer attachment circuit to Z on peer node OTN4 i.e., "TAII: Z on 4". The RR shares this with PLE2 and PLE3, at 442.

Then, in the underlay transport, at 444, ASBR selection is again used to determine/select the best gateway node (PLE2 or PLE3) to use to connect to OTN4. At 446, PLE1 sends a request to the PCE to compute an SR policy path to OTN4. As the PCE understands domain boundaries, it can compute a path from PLE1 to OTN4. When the PCE receives the SR policy path request, the PCE decides that PLE2 is the best boundary node to use, and at 448, initiates an SR policy to be set up to OTN4 and indicates to PLE2 to dump the traffic in the binding segment identifier (BSID) for transport on the OTN circuit that has been set up between PLE2 and 4. Before responding to PLE1 with a path, the PCE initiates an SR policy in PLE2 towards OTN4. This triggers PLE2, at 450, to initiate a GMPLS circuit setup (RSVP PATH message) through the OTN domain from PLE2 to OTN4. As described above, the TAII Z is encoded in the ERO.

Now, at 452, the PCE can respond to PLE1 with a path, such as {1A, A2, GMPLS}, where GMPLS is the BSID of the SR policy in PLE2 representing the segment through the OTN domain. Also, at 454, the reverse path from PLE2 to PLE1 in packet domain is set up. To facilitate this, the PCE installs the reverse policy from PLE2 to PLE1 with path {A2, 1A}.

After receiving the GMPLS RSVP RESV message from the OTN domain (from OTN4) at 456, the end-to-end setup is completed by, at 458, PLE2 advertising the EAD/EVI route for Z on OTN4 with RD representing OTN4.

Although the above descriptions in connection with FIG. 4A and FIG. 4B are for SR-TE, this applies as well to RSVP-TE as well.

OTN Domain is the Initiator

Figure 5:
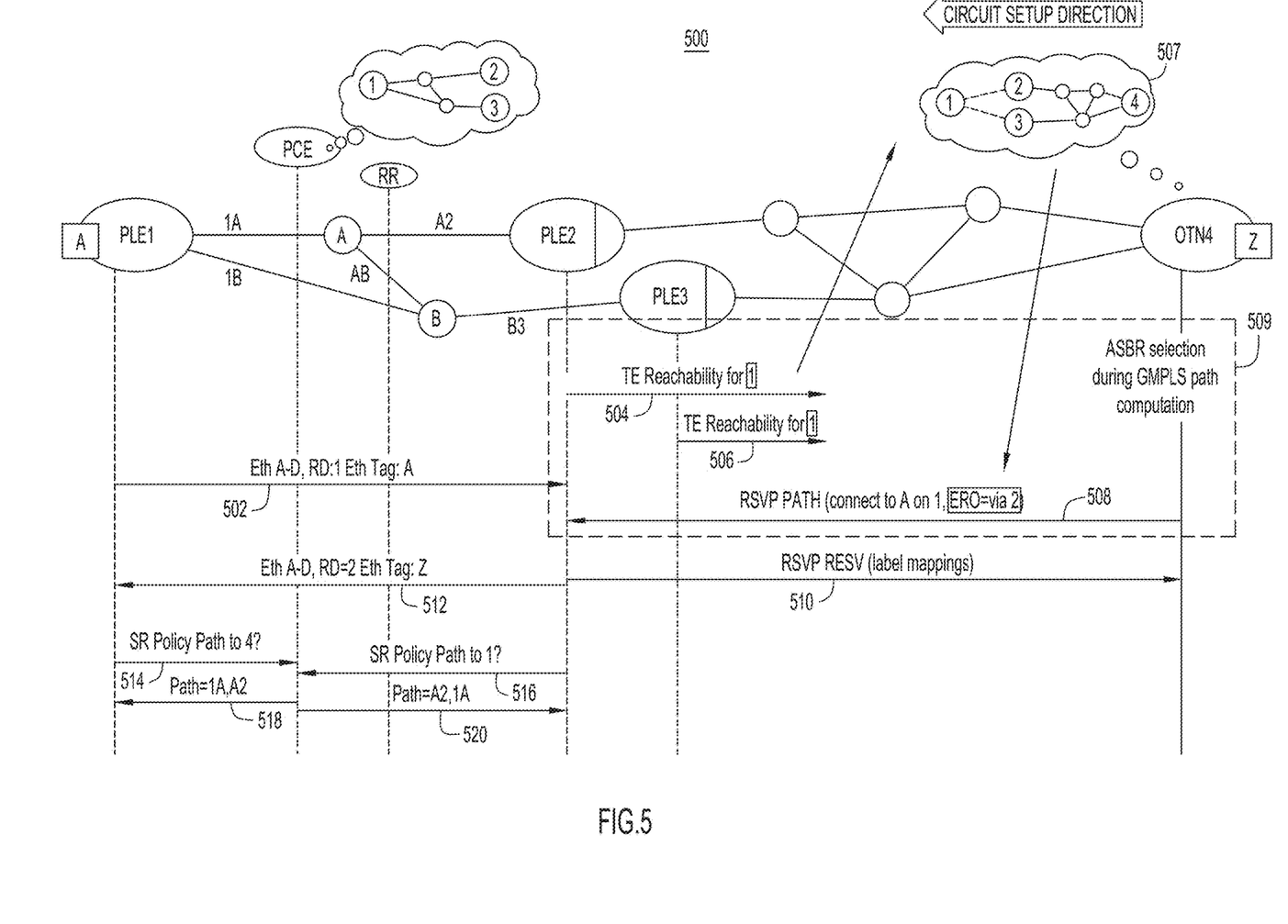
FIG. 5 is a diagram depicting a process by which the circuit setup is initiated in the optical networking domain, according to an example embodiment.

Reference is now made to FIG. 5. FIG. 5 illustrates a process 500 by which the circuit setup is initiated in the OTN domain, e.g., by OTN4. Thus, in this scenario, OTN4 is the initiator and PLE1 is the terminator.

Independent of any end-to-end circuit setup, as soon as the local attachment circuit (AC) on PLE1 is provisioned, PLE1 will advertise the EAD/EVI route for it. This is shown at 502 in FIG. 5, where PLE1 advertises "Eth A-D, RD: 1 Eth Tag:A".

In order for OTN4 to be able to perform a path computation to PLE1, at 504 and 506, boundary gateways nodes PLE2 and PLE3 inject reachability information to PLE1 into the traffic engineering database (TED) 507 of the OTN domain. This may be done, for example, by inserting a forwarding adjacency (FA) between PLE2 and PLE1. Alternatively, OTN4 (or any other OTN node terminating a circuit) could be configured with a list of valid border nodes for circuit destinations outside the OTN domain. Although OTN4 is not aware of the detailed packet topology, OTN4 still can determine the most appropriate border node to reach PLE1 (e.g., PLE2) and compute a strict path through the OTN domain to PLE2.

Upon provisioning the circuit between the local port Z and port A on PLE1 (this may happen on-demand in case of a working/protect path failure identified by OTN4), at 508, OTN4 triggers a GMPLS setup procedure by sending a RSVP PATH message with ERO having an explicit hop towards PLE2, a loose hop between PLE2 and PLE1 and "TAII A" encoded as a generalized label, per RFC 4003, for example. Steps 504, 506 and 508 may be considered as a ASBR selection procedure 509 during GMPLS path computation.

At 510, PLE2 upon receiving the RSVP PATH message, responds with a RSVP RESV message, with label mappings. Also, at 512, PLE2 advertises its EAD route for the AC info of Z on OTN4, i.e., "Eth A-D, RD=2 Eth Tag:Z". This will allow the PW to be established between PLE1 and PLE2.

At steps 514, 516, 518 and 520, the PCE interacts with PLE2 and PLE1 to configure the SR policy paths, similar to that described above for steps 420, 422, 424 and 426 in connection with FIG. 4A.

Path Computation Considerations

In the cases depicted in FIGS. 4A/4B and 5, the initiator node only has detailed topology knowledge of the local domain. Thus, the signaling procedure may fail due to unavailable resources or constraints not being met. In such a case, the "crank back" routing process as in RFC 4920 may also be applied and a new signaling request, for example, via a different border node can be attempted.

Applicability Beyond OTN and PLE

The described procedures equally apply to OTN, SONET and SDH running GMPLS in the TDM (optical) domain and native Ethernet L2VPN and PLE in the packet domain. Whether native ethernet L2VPN or PLE is used, may be determined by the system configuration of the border nodes. Independent of which combination of domain technologies is used, translation of appropriate client interface mapping parameters during signaling is performed by the boundary gateway nodes (e.g., GMPLS G-PID< >PLE attribute).

In summary, these techniques involve removing the unnecessary provisioning system complexities of manual inter-domain service/circuit stitching by introducing a solution to perform dynamic end-to-end circuit setup in a hybrid network. Moreover, these techniques allow for performing on-demand restoration across domain boundaries, which allows network operators to maintain or increase high service uptime and reduce the amount of pre-provisioned network resources.

The techniques presented herein apply to any combination of native ethernet VPWS or PLE used in the packet and OTN, as well as SONET or SDH used in a TDM network domain. Again, there is no solution heretofore known for dynamically establishing an inter-domain end-to-end circuit where the domains are of different technology types, such as where one domain is packet and the other is optical (e.g., OTN). The technology interworking solution presented herein does not involve any new mechanisms or changes to the OTN protocols in the OTN domain. That is, this solution achieves circuit restoration by limiting change implementations to ASBR nodes, which may facilitate deployment in a brownfield network. The proposed changes to EVPN are minor and also address the use case of single side EVPN provisioning (where provisioning is done by the initiator) which is useful as well.

The embodiments presented herein solve the problem of ASBR node selection without requiring a single (fully-aware) PCE. Moreover, the embodiments presented herein do not involve any inter-PCE communication. The ABSR nodes participate in both the packet and OTN topology and can inject topological and reachability information to allow the path computation in each domain to find a path to the destination in the other domain.

The embodiments presented herein apply to any and all restoration schemes, such as 1+R and 1+1+R, and for the latter also the R could either be setup only after both the working circuit and the protect circuit are down, or already ahead of time when the working circuit and the protect circuit are down.

There are numerous permutations to which these techniques may apply to compute a path and set it up via a dynamically (on-demand) selected (best) ASBR node between the two domains. Without the mechanisms presented herein, a "restore ASBR node" would need to be pre-defined which makes a deployment very cumbersome and challenging because the ASBR node choice depends on the circuit routing and topology of both domains.

These techniques allow an operator already leveraging restoration in an OTN network to migrate to PLE/Eline over Routed Optical Network (RON) (where Eline is a regular Ethernet point-to-point connection, such as point-to-point Ethernet over MPLS) while maintaining the capability of restoration across the domains. This could be useful for operators to the move towards RON (away from OTN).

Figure 6:
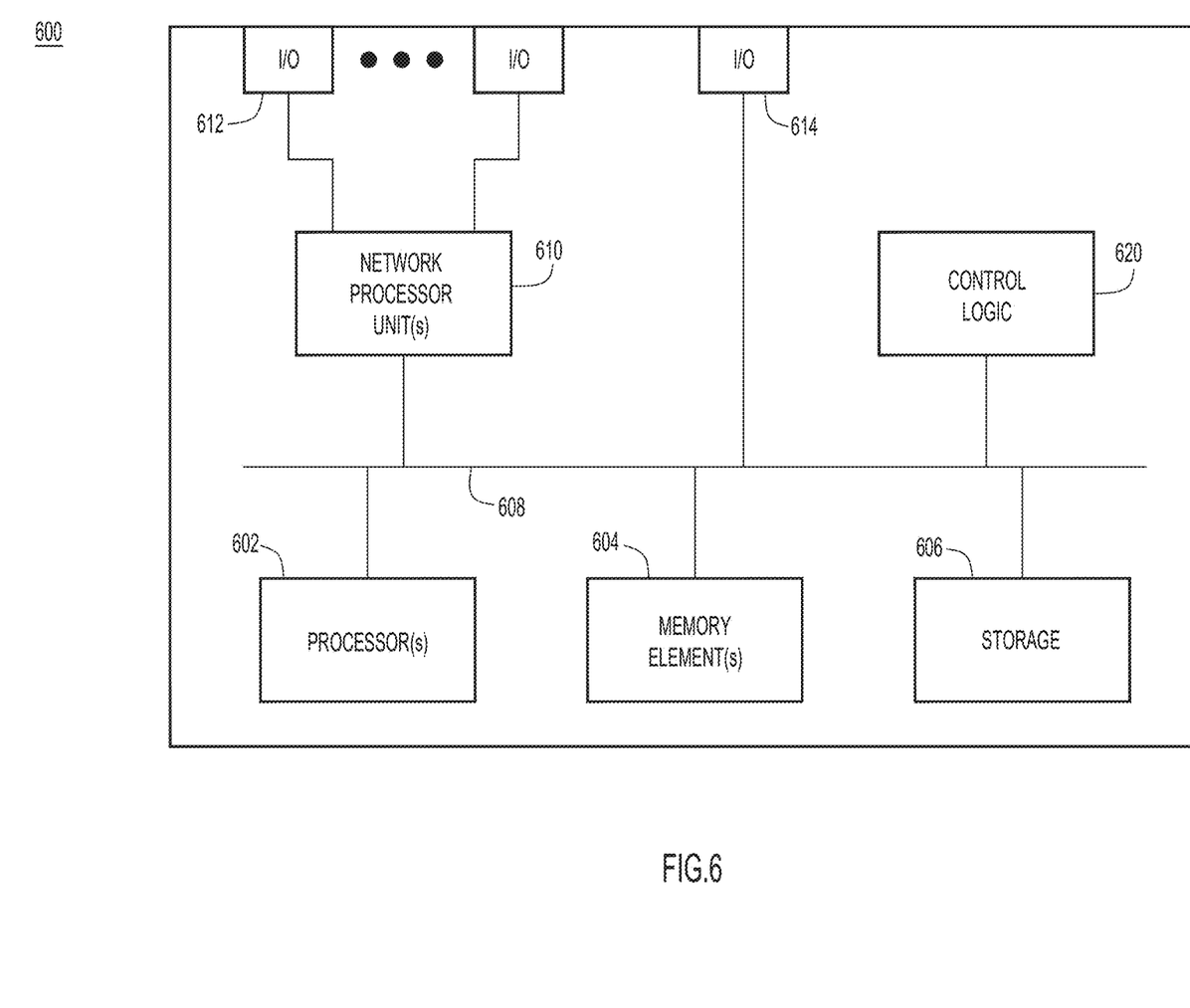
FIG. 6 illustrates a hardware block diagram of a device configured to perform functions associated with operations of the techniques presented herein, such as a gateway node, according to an example embodiment.

Referring to FIG. 6, FIG. 6 illustrates a hardware block diagram of a device 600 that may perform functions associated with operations discussed herein in connection with the techniques depicted in FIGS. 1A, 1B, 2, 3, 4A, 4B and 5. In various embodiments, a networking device or apparatus, such as device 600 may be configured as any entity/entities, nodes or devices, such as boundary gateway nodes, as discussed for the techniques depicted in connection with FIGS. 1A, 1B. 2, 3, 4A, 4B and 5 in order to perform operations of the various techniques discussed herein.

In at least one embodiment, the device 600 may be any apparatus that may include one or more processor(s) 602, one or more memory element(s) 604, storage 606, a bus 608, one or more network processor unit(s) 610 interconnected with one or more network input/output (I/O) interface(s) 612, one or more I/O interface(s) 614, and control logic 620. In various embodiments, instructions associated with logic for device 600 can overlap in any manner and are not limited to the specific allocation of instructions and/or operations described herein.

In at least one embodiment, processor(s) 602 is/are at least one hardware processor configured to execute various tasks, operations and/or functions for device 600 as described herein according to software and/or instructions configured for device 600. Processor(s) 602 (e.g., a hardware processor) can execute any type of instructions associated with data to achieve the operations detailed herein. In one example, processor(s) 602 can transform an element or an article (e.g., data, information) from one state or thing to another state or thing. Any of potential processing elements, microprocessors, digital signal processor, baseband signal processor, modem, PHY, controllers, systems, managers, logic, and/or machines described herein can be construed as being encompassed within the broad term 'processor'.

In at least one embodiment, memory element(s) 604 and/or storage 606 is/are configured to store data, information, software, and/or instructions associated with device 600, and/or logic configured for memory element(s) 604 and/or storage 606. For example, any logic described herein (e.g., control logic 620) can, in various embodiments, be stored for device 600 using any combination of memory element(s) 604 and/or storage 606. Note that in some embodiments, storage 606 can be consolidated with memory element(s) 604 (or vice versa), or can overlap/exist in any other suitable manner.

In at least one embodiment, bus 608 can be configured as an interface that enables one or more elements of device 600 to communicate in order to exchange information and/or data. Bus 608 can be implemented with any architecture designed for passing control, data and/or information between processors, memory elements/storage, peripheral devices, and/or any other hardware and/or software components that may be configured for device 600. In at least one embodiment, bus 608 may be implemented as a fast kernel-hosted interconnect, potentially using shared memory between processes (e.g., logic), which can enable efficient communication paths between the processes.

In various embodiments, network processor unit(s) 610 may enable communication between device 600 and other systems, entities, etc., via network I/O interface(s) 612 (wired and/or wireless) to facilitate operations discussed for various embodiments described herein. In various embodiments, network processor unit(s) 610 can be configured as a combination of hardware and/or software, such as one or more Ethernet driver(s) and/or controller(s) or interface cards, Fibre Channel (e.g., optical) driver(s) and/or controller(s), wireless receivers/transmitters/transceivers, baseband processor(s)/modem(s), and/or other similar network interface driver(s) and/or controller(s) now known or hereafter developed to enable communications between device 600 and other systems, entities, etc. to facilitate operations for various embodiments described herein. In various embodiments, network I/O interface(s) 612 can be configured as one or more Ethernet port(s), Fibre Channel ports, any other I/O port(s), and/or antenna(s)/antenna array(s) now known or hereafter developed. Thus, the network processor unit(s) 610 and/or network I/O interface(s) 612 may include suitable interfaces for receiving, transmitting, and/or otherwise communicating data and/or information in a network environment.

I/O interface(s) 614 allow for input and output of data and/or information with other entities that may be connected to device 600. For example, I/O interface(s) 614 may provide a connection to external devices such as a keyboard, keypad, a touch screen, and/or any other suitable input and/or output device now known or hereafter developed. In some instances, external devices can also include portable computer readable (non-transitory) storage media such as database systems, thumb drives, portable optical or magnetic disks, and memory cards. In still some instances, external devices can be a mechanism to display data to a user, such as, for example, a computer monitor, a display screen, or the like.

In various embodiments, control logic 620 can include instructions that, when executed, cause processor(s) 602 to perform operations, which can include, but not be limited to, providing overall control operations of device; interacting with other entities, systems, etc. described herein; maintaining and/or interacting with stored data, information, parameters, etc. (e.g., memory element(s), storage, data structures, databases, tables, etc.); combinations thereof; and/or the like to facilitate various operations for embodiments described herein.

The programs described herein (e.g., control logic 620) may be identified based upon application(s) for which they are implemented in a specific embodiment. However, it should be appreciated that any particular program nomenclature herein is used merely for convenience; thus, embodiments herein should not be limited to use(s) solely described in any specific application(s) identified and/or implied by such nomenclature.

In various embodiments, any entity or apparatus as described herein may store data/information in any suitable volatile and/or non-volatile memory item (e.g., magnetic hard disk drive, solid state hard drive, semiconductor storage device, random access memory (RAM), read only memory (ROM), erasable programmable read only memory (EPROM), application specific integrated circuit (ASIC), etc.), software, logic (fixed logic, hardware logic, programmable logic, analog logic, digital logic), hardware, and/or in any other suitable component, device, element, and/or object as may be appropriate. Any of the memory items discussed herein should be construed as being encompassed within the broad term 'memory element'. Data/information being tracked and/or sent to one or more entities as discussed herein could be provided in any database, table, register, list, cache, storage, and/or storage structure: all of which can be referenced at any suitable timeframe. Any such storage options may also be included within the broad term 'memory element' as used herein.

Note that in certain example implementations, operations as set forth herein may be implemented by logic encoded in one or more tangible media that is capable of storing instructions and/or digital information and may be inclusive of non-transitory tangible media and/or non-transitory computer readable storage media (e.g., embedded logic provided in: an ASIC, digital signal processing (DSP) instructions, software [potentially inclusive of object code and source code], etc.) for execution by one or more processor(s), and/or other similar machine, etc. Generally, memory element(s) 604 and/or storage 606 can store data, software, code, instructions (e.g., processor instructions), logic, parameters, combinations thereof, and/or the like used for operations described herein. This includes memory element(s) 604 and/or storage 606 being able to store data, software, code, instructions (e.g., processor instructions), logic, parameters, combinations thereof, or the like that are executed to carry out operations in accordance with teachings of the present disclosure.

In some instances, software of the present embodiments may be available via a non-transitory computer useable medium (e.g., magnetic or optical mediums, magneto-optic mediums, CD-ROM, DVD, memory devices, etc.) of a stationary or portable program product apparatus, downloadable file(s), file wrapper(s), object(s), package(s), container(s), and/or the like. In some instances, non-transitory computer readable storage media may also be removable. For example, a removable hard drive may be used for memory/storage in some implementations. Other examples may include optical and magnetic disks, thumb drives, and smart cards that can be inserted and/or otherwise connected to a device for transfer onto another computer readable storage medium.

In some aspects, the techniques described herein relate to a method performed by a gateway node at a boundary of a first domain and a second domain of a hybrid network, the first domain and the second domain using different types of transport and different types of control planes, the method including: advertising in the first domain, reachability information to nodes in the second domain; receiving from a first node in the first domain, a request to set up a circuit from a first endpoint on the first node to a second endpoint on a second node in the second domain, the request (a) causing a selection leveraging a control plane in the first domain of the gateway node among a plurality of gateway nodes at the boundary of the first domain and the second domain, or (b) indicating the selection of the gateway node by the first node, based on the reachability information to establish the circuit; sending to the second node a message to establish a connection in the second domain from the gateway node to the second node; receiving from the second node a message confirming establishment of the connection between the second node and the gateway node; and sending to the first node a message indicating that the gateway node has successfully set up the circuit between the first node and the second node.

In some aspects, the first domain is a packet network domain and the second domain is an optical network domain.

In some aspects, the first domain uses an overlay protocol and an underlay transport protocol.

In some aspects, the techniques described herein relate to a method, wherein the overlay protocol is Border Gateway Protocol to support Ethernet Virtual Private Network (EVPN)-Virtual Private Wire Service (VPWS) and the underlay transport protocol is Resource Reservation Protocol-Traffic Engineering (RSVP-TE) or Segment Routing Traffic Engineering (SR-TE) tunneling.

In some aspects, receiving the request from the first node includes receiving an indication of the selection of the gateway node in a control plane message according to the overlay protocol.

In some aspects, advertising includes advertising reachability to the second node in the second domain using a Multiprotocol Reachability Network Layer Reachability attribute of BGP; sending the message to the second node includes sending a Resource Reservation Protocol (RSVP) PATH message, and receiving the message from the second node includes receiving an RSVP RESV message.

In some aspects, the gateway node is selected by a path computation element and the selection of the gateway node is indicated in a control plane message according to the underlay transport protocol.

In some aspects, advertising includes advertising TE reachability information carried within a RSVP PATH message or encoded in a SR-TE segment list to the second node in the second domain; sending the message to the second node includes sending a RSVP PATH message, and receiving the message from the second node includes receiving an RSVP RESV message.

In some aspects, the first domain is an optical network domain and the second domain is a packet network domain.

In some aspects, advertising includes advertising into the first domain, Traffic Engineering (TE) reachability of the second node in the second domain; the selection of the gateway node by the control plane in the first domain is an Autonomous System Border Router selection made during a Generalized Multi-Protocol Label Switching path computation; the request received from the first node is a Resource Reservation Protocol (RSVP) PATH message that indicates the selection of the gateway node in an Explicit Route Object (ERO); sending the message to the second node includes sending a message advertising its Ethernet Auto Discovery Route/EVPN Instance (EAD/EVI) route for the first node; and sending the message to the first node includes sending an RSPV RESV message.

In some aspects, the circuit is a working circuit, a protecting circuit, or a restore circuit.

In some aspects, the techniques described herein relate to an apparatus including: a network interface configured to enable network communications on behalf of a gateway node at a boundary of a first domain and a second domain of a hybrid network, the first domain and the second domain using different types of transport and different types of control planes; and one or more processors coupled to the network interface, the one or more processors configured to perform operations including: generating one or more messages for advertising in the first domain, reachability information to nodes in the second domain; receiving from a first node in the first domain, a request to set up a circuit from a first endpoint on the first node to a second endpoint on a second node in the second domain, the request (a) causing a selection of the gateway node leveraging a control plane in the first domain or (b) indicating the selection of the gateway node by the first node, based on the reachability information to establish the circuit among a plurality of gateway nodes at the boundary of the first domain and the second domain; sending to the second node a message to establish a connection in the second domain from the gateway node to the second node; receiving from the second node a message confirming establishment of the connection between the second node and the gateway node; and sending to the first node a message indicating that the gateway node has successfully set up the circuit between the first node and the second node.

In some aspects, the techniques described herein relate to an apparatus, wherein the first domain is a packet network domain and the second domain is an optical network domain, and the first domain uses an overlay protocol and an underlay transport protocol.

In some aspects, the techniques described herein relate to an apparatus, wherein receiving the request from the first node includes receiving an indication of the selection of the gateway node in a control plane message according to the overlay protocol.

In some aspects, the techniques described herein relate to an apparatus, wherein the gateway node is selected by a path computation element and the selection of the gateway node is indicated in a control plane message according to the underlay transport protocol.

In some aspects, the techniques described herein relate to an apparatus, wherein the first domain is an optical network domain and the second domain is a packet network domain, and wherein the selection of the gateway node by the control plane in the first domain is an Autonomous System Border Router selection made during a Generalized Multi-Protocol Label Switching path computation.

In some aspects, the techniques described herein relate to a system including: a plurality of gateway nodes at a boundary of a first domain and a second domain of a hybrid network, the first domain and the second domain using different types of transport and different types of control planes; a first node in the first domain, the first node having a first endpoint connected thereto; and a second node in the second domain, the second node having a second endpoint connected thereto; wherein: two or more of the plurality of gateway nodes advertise in the first domain, reachability information to nodes in the second domain; the first node sends a request to set up a circuit from the first endpoint on the first node to the second endpoint on the second node, the request (a) causing a selection leveraging a control plane in the first domain of a particular gateway node among the plurality of gateway nodes, or (b) indicating the selection of the particular gateway node by the first node, based on the reachability information to establish the circuit; the particular gateway node sending a message to establish a connection in the second domain from the particular gateway node to the second node; the second node sending to the particular gateway node a message confirming establishment of the connection between the second node and the particular gateway node; and the particular gateway node sending to the first node a message indicating that the particular gateway node has successfully set up the circuit between the first node and the second node.

In some aspects, the techniques described herein relate to a system, wherein the first domain is a packet network domain and the second domain is an optical network domain, and the first domain uses an overlay protocol and an underlay transport protocol.

In some aspects, the techniques described herein relate to a system, wherein the request from the first node includes an indication of the selection of the particular gateway node in a control plane message according to the overlay protocol.

In some aspects, the techniques described herein relate to a system, wherein the particular gateway node is selected by a path computation element and the selection of the particular gateway node is indicated in a control plane message according to the underlay transport protocol.

In some aspects, the techniques described herein relate to a system, wherein the first domain is an optical network domain and the second domain is a packet network domain, and wherein the selection of the particular gateway node by the control plane in the first domain is an Autonomous System Border Router selection made during a Generalized Multi-Protocol Label Switching path computation.

Variations and Implementations

Embodiments described herein may include one or more networks, which can represent a series of points and/or network elements of interconnected communication paths for receiving and/or transmitting messages (e.g., packets of information) that propagate through the one or more networks. These network elements offer communicative interfaces that facilitate communications between the network elements. A network can include any number of hardware and/or software elements coupled to (and in communication with) each other through a communication medium. Such networks can include, but are not limited to, any local area network (LAN), virtual LAN (VLAN), wide area network (WAN) (e.g., the Internet), software defined WAN (SD-WAN), wireless local area (WLA) access network, wireless wide area (WWA) access network, metropolitan area network (MAN), Intranet, Extranet, virtual private network (VPN), Low Power Network (LPN), Low Power Wide Area Network (LPWAN), Machine to Machine (M2M) network, Internet of Things (IoT) network, Ethernet network/switching system, any other appropriate architecture and/or system that facilitates communications in a network environment, and/or any suitable combination thereof.

Networks through which communications propagate can use any suitable technologies for communications including wireless communications (e.g., 4G/5G/nG, IEEE 802.11 (e.g., Wi-Fi®/Wi-Fi6®), IEEE 802.16 (e.g., Worldwide Interoperability for Microwave Access (WiMAX)), Radio-Frequency Identification (RFID), Near Field Communication (NFC), Bluetooth™, mm.wave, Ultra-Wideband (UWB), etc.), and/or wired communications (e.g., T1 lines, T3 lines, digital subscriber lines (DSL), Ethernet, Fibre Channel, etc.). Generally, any suitable means of communications may be used such as electric, sound, light, infrared, and/or radio to facilitate communications through one or more networks in accordance with embodiments herein. Communications, interactions, operations, etc. as discussed for various embodiments described herein may be performed among entities that may directly or indirectly connected utilizing any algorithms, communication protocols, interfaces, etc. (proprietary and/or non-proprietary) that allow for the exchange of data and/or information.

In various example implementations, any entity or apparatus for various embodiments described herein can encompass network elements (which can include virtualized network elements, functions, etc.) such as, for example, network appliances, forwarders, routers, servers, switches, gateways, bridges, loadbalancers, firewalls, processors, modules, radio receivers/transmitters, or any other suitable device, component, element, or object operable to exchange information that facilitates or otherwise helps to facilitate various operations in a network environment as described for various embodiments herein. Note that with the examples provided herein, interaction may be described in terms of one, two, three, or four entities. However, this has been done for purposes of clarity, simplicity and example only. The examples provided should not limit the scope or inhibit the broad teachings of systems, networks, etc. described herein as potentially applied to a myriad of other architectures.

Communications in a network environment can be referred to herein as 'messages', 'messaging', 'signaling', 'data', 'content', 'objects', 'requests', 'queries', 'responses', 'replies', etc. which may be inclusive of packets. As referred to herein and in the claims, the term 'packet' may be used in a generic sense to include packets, frames, segments, datagrams, and/or any other generic units that may be used to transmit communications in a network environment. Generally, a packet is a formatted unit of data that can contain control or routing information (e.g., source and destination address, source and destination port, etc.) and data, which is also sometimes referred to as a 'payload', 'data payload', and variations thereof. In some embodiments, control or routing information, management information, or the like can be included in packet fields, such as within header(s) and/or trailer(s) of packets. Internet Protocol (IP) addresses discussed herein and in the claims can include any IP version 4 (IPv4) and/or IP version 6 (IPv6) addresses.

To the extent that embodiments presented herein relate to the storage of data, the embodiments may employ any number of any conventional or other databases, data stores or storage structures (e.g., files, databases, data structures, data or other repositories, etc.) to store information.

Note that in this Specification, references to various features (e.g., elements, structures, nodes, modules, components, engines, logic, steps, operations, functions, characteristics, etc.) included in 'one embodiment', 'example embodiment', 'an embodiment', 'another embodiment', 'certain embodiments', 'some embodiments', 'various embodiments', 'other embodiments', 'alternative embodiment', and the like are intended to mean that any such features are included in one or more embodiments of the present disclosure, but may or may not necessarily be combined in the same embodiments. Note also that a module, engine, client, controller, function, logic or the like as used herein in this Specification, can be inclusive of an executable file comprising instructions that can be understood and processed on a server, computer, processor, machine, compute node, combinations thereof, or the like and may further include library modules loaded during execution, object files, system files, hardware logic, software logic, or any other executable modules.

It is also noted that the operations and steps described with reference to the preceding figures illustrate only some of the possible scenarios that may be executed by one or more entities discussed herein. Some of these operations may be deleted or removed where appropriate, or these steps may be modified or changed considerably without departing from the scope of the presented concepts. In addition, the timing and sequence of these operations may be altered considerably and still achieve the results taught in this disclosure. The preceding operational flows have been offered for purposes of example and discussion. Substantial flexibility is provided by the embodiments in that any suitable arrangements, chronologies, configurations, and timing mechanisms may be provided without departing from the teachings of the discussed concepts.

As used herein, unless expressly stated to the contrary, use of the phrase 'at least one of', 'one or more of', 'and/or', variations thereof, or the like are open-ended expressions that are both conjunctive and disjunctive in operation for any and all possible combination of the associated listed items. For example, each of the expressions 'at least one of X, Y and Z', 'at least one of X, Y or Z', 'one or more of X, Y and Z', 'one or more of X, Y or Z' and 'X, Y and/or Z' can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z.

Each example embodiment disclosed herein has been included to present one or more different features. However, all disclosed example embodiments are designed to work together as part of a single larger system or method. This disclosure explicitly envisions compound embodiments that combine multiple previously-discussed features in different example embodiments into a single system or method.

Additionally, unless expressly stated to the contrary, the terms 'first', 'second', 'third', etc., are intended to distinguish the particular nouns they modify (e.g., element, condition, node, module, activity, operation, etc.). Unless expressly stated to the contrary, the use of these terms is not intended to indicate any type of order, rank, importance, temporal sequence, or hierarchy of the modified noun. For example, 'first X' and 'second X' are intended to designate two 'X' elements that are not necessarily limited by any order, rank, importance, temporal sequence, or hierarchy of the two elements. Further as referred to herein, 'at least one of' and 'one or more of' can be represented using the '(s)' nomenclature (e.g., one or more element(s)).

One or more advantages described herein are not meant to suggest that any one of the embodiments described herein necessarily provides all of the described advantages or that all the embodiments of the present disclosure necessarily provide any one of the described advantages. Numerous other changes, substitutions, variations, alterations, and/or modifications may be ascertained to one skilled in the art and it is intended that the present disclosure encompass all such changes, substitutions, variations, alterations, and/or modifications as falling within the scope of the appended claims.

What is claimed is:

1. A method performed by a gateway node at a boundary of a first domain and a second domain of a hybrid network, the first domain and the second domain using different types of transport and different types of control planes, the method comprising:
    advertising in the first domain, reachability information to nodes in the second domain;
    receiving from a first node in the first domain, a request to set up a circuit from a first endpoint on the first node to a second endpoint on a second node in the second domain, the request (a) causing a selection leveraging a control plane in the first domain of the gateway node among a plurality of gateway nodes at the boundary of the first domain and the second domain, or (b) indicating the selection of the gateway node by the first node, based on the reachability information to establish the circuit;
    sending to the second node a message to establish a connection in the second domain from the gateway node to the second node;
    receiving from the second node a message confirming establishment of the connection between the second node and the gateway node; and
    sending to the first node a message indicating that the gateway node has successfully set up the circuit between the first node and the second node.

2. The method of claim 1, wherein the first domain is a packet network domain and the second domain is an optical network domain.

3. The method of claim 2, wherein the first domain uses an overlay protocol and an underlay transport protocol.

4. The method of claim 3, wherein the overlay protocol is Border Gateway Protocol to support Ethernet Virtual Private Network (EVPN)-Virtual Private Wire Service (VPWS) and the underlay transport protocol is Resource Reservation Protocol-Traffic Engineering (RSVP-TE) or Segment Routing Traffic Engineering (SR-TE) tunneling.

5. The method of claim 4, wherein receiving the request from the first node includes receiving an indication of the selection of the gateway node in a control plane message according to the overlay protocol.

6. The method of claim 5, wherein:
    advertising comprises advertising reachability to the second node in the second domain using a Multiprotocol Reachability Network Layer Reachability attribute of BGP;
    sending the message to the second node comprises sending a Resource Reservation Protocol (RSVP) PATH message, and
    receiving the message from the second node comprises receiving an RSVP RESV message.

7. The method of claim 4, wherein the gateway node is selected by a path computation element and the selection of the gateway node is indicated in a control plane message according to the underlay transport protocol.

8. The method of claim 7, wherein:
    advertising comprises advertising TE reachability information carried within a RSVP PATH message or encoded in a SR-TE segment list to the second node in the second domain;
    sending the message to the second node comprises sending a RSVP PATH message, and
    receiving the message from the second node comprises receiving an RSVP RESV message.

9. The method of claim 1, wherein the first domain is an optical network domain and the second domain is a packet network domain.

10. The method of claim 9, wherein:
    advertising comprises advertising into the first domain, Traffic Engineering (TE) reachability of the second node in the second domain;
    the selection of the gateway node by the control plane in the first domain is an Autonomous System Border Router selection made during a Generalized Multi-Protocol Label Switching path computation;
    the request received from the first node is a Resource Reservation Protocol (RSVP) PATH message that indicates the selection of the gateway node in an Explicit Route Object (ERO);
    sending the message to the second node comprises sending a message advertising its Ethernet Auto Discovery Route/EVPN Instance (EAD/EVI) route for the first node; and
    sending the message to the first node comprises sending an RSPV RESV message.

11. The method of claim 1, wherein the circuit is a working circuit, a protecting circuit, or a restore circuit.

12. An apparatus comprising:
    a network interface configured to enable network communications on behalf of a gateway node at a boundary of a first domain and a second domain of a hybrid network, the first domain and the second domain using different types of transport and different types of control planes; and
    one or more processors coupled to the network interface, the one or more processors configured to perform operations including:
        generating one or more messages for advertising in the first domain, reachability information to nodes in the second domain;
        receiving from a first node in the first domain, a request to set up a circuit from a first endpoint on the first node to a second endpoint on a second node in the second domain, the request (a) causing a selection of the gateway node leveraging a control plane in the first domain or (b) indicating the selection of the gateway node by the first node, based on the reachability information to establish the circuit among a plurality of gateway nodes at the boundary of the first domain and the second domain;
        sending to the second node a message to establish a connection in the second domain from the gateway node to the second node;
        receiving from the second node a message confirming establishment of the connection between the second node and the gateway node; and
        sending to the first node a message indicating that the gateway node has successfully set up the circuit between the first node and the second node.

13. The apparatus of claim 12, wherein the first domain is a packet network domain and the second domain is an optical network domain, and the first domain uses an overlay protocol and an underlay transport protocol.

14. The apparatus of claim 13, wherein receiving the request from the first node includes receiving an indication of the selection of the gateway node in a control plane message according to the overlay protocol.

15. The apparatus of claim 13, wherein the gateway node is selected by a path computation element and the selection of the gateway node is indicated in a control plane message according to the underlay transport protocol.

16. The apparatus of claim 12, wherein the first domain is an optical network domain and the second domain is a packet network domain, and wherein the selection of the gateway node by the control plane in the first domain is an Autonomous System Border Router selection made during a Generalized Multi-Protocol Label Switching path computation.

17. A system comprising:
a plurality of gateway nodes at a boundary of a first domain and a second domain of a hybrid network, the first domain and the second domain using different types of transport and different types of control planes;
a first node in the first domain, the first node having a first endpoint connected thereto; and
a second node in the second domain, the second node having a second endpoint connected thereto;
wherein:
two or more of the plurality of gateway nodes advertise in the first domain, reachability information to nodes in the second domain;
the first node sends a request to set up a circuit from the first endpoint on the first node to the second endpoint on the second node, the request (a) causing a selection leveraging a control plane in the first domain of a particular gateway node among the plurality of gateway nodes, or (b) indicating the selection of the particular gateway node by the first node, based on the reachability information to establish the circuit;
the particular gateway node sending a message to establish a connection in the second domain from the particular gateway node to the second node;
the second node sending to the particular gateway node a message confirming establishment of the connection between the second node and the particular gateway node; and
the particular gateway node sending to the first node a message indicating that the particular gateway node has successfully set up the circuit between the first node and the second node.

18. The system of claim 17, wherein the first domain is a packet network domain and the second domain is an optical network domain, and the first domain uses an overlay protocol and an underlay transport protocol.

19. The system of claim 18, wherein the request from the first node includes an indication of the selection of the particular gateway node in a control plane message according to the overlay protocol.

20. The system of claim 18, wherein the particular gateway node is selected by a path computation element and the selection of the particular gateway node is indicated in a control plane message according to the underlay transport protocol.

21. The system of claim 17, wherein the first domain is an optical network domain and the second domain is a packet network domain, and wherein the selection of the particular gateway node by the control plane in the first domain is an Autonomous System Border Router selection made during a Generalized Multi-Protocol Label Switching path computation.

* * * * *